Nov. 29, 1927.

F. McKAY 1,650,997

TELEGRAPH RECEIVER

Filed Nov. 14, 1923

Inventor.
Francis McKay

Nov. 29, 1927. 1,650,997
F. McKAY
TELEGRAPH RECEIVER
Filed Nov. 14, 1923 4 Sheets-Sheet 3

Inventor.
Francis McKay

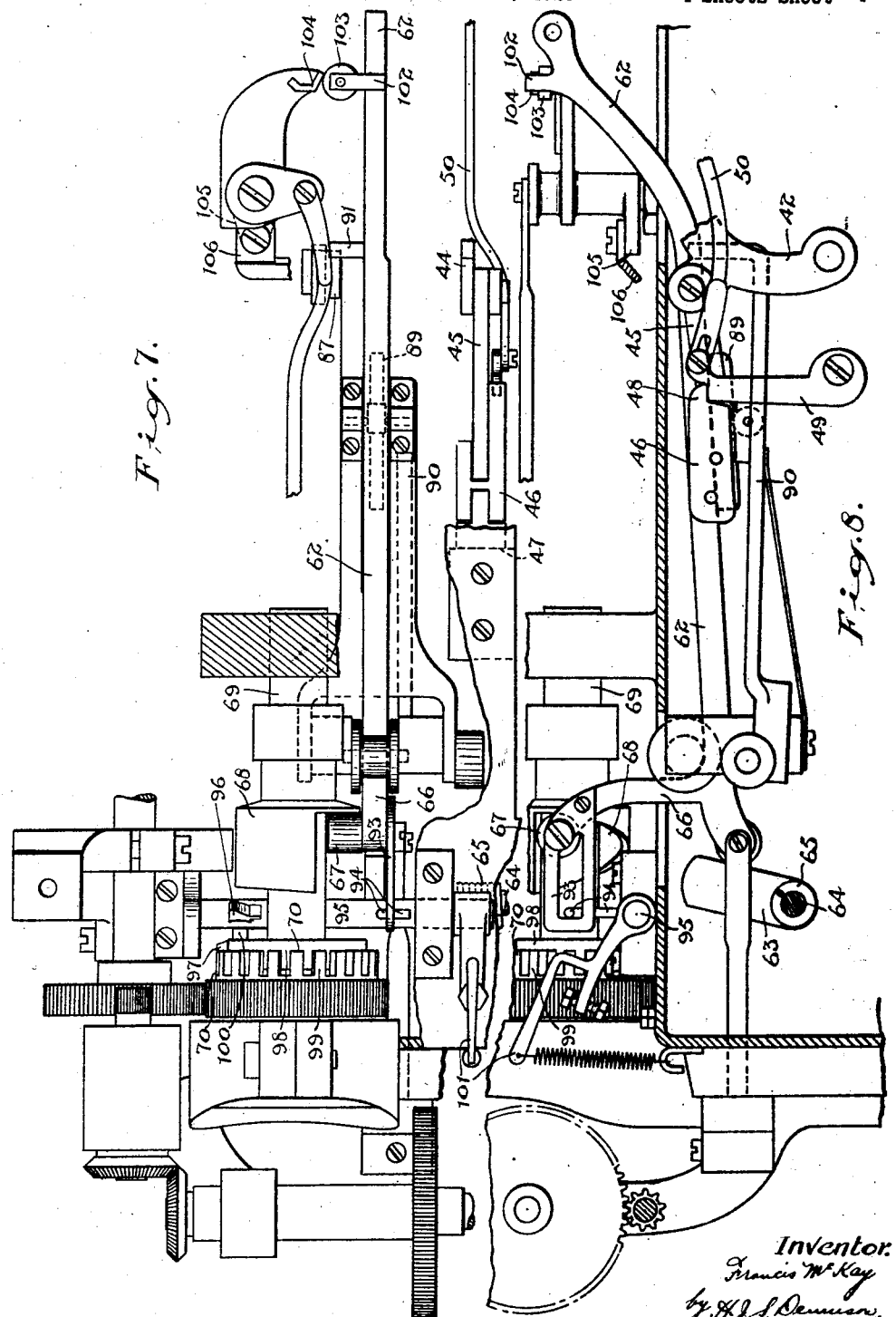

Patented Nov. 29, 1927.

1,650,997

UNITED STATES PATENT OFFICE.

FRANCIS McKAY, OF HAMILTON, ONTARIO, CANADA, ASSIGNOR TO MERCANTILE TRUST COMPANY OF CANADA, LIMITED, IN TRUST, OF HAMILTON, ONTARIO, CANADA.

TELEGRAPH RECEIVER.

Application filed November 14, 1923. Serial No. 674,773.

The invention relates to an improved telegraphic receiving apparatus and the particular objects of the invention are to provide a simple and compact structure which may be utilized to advantage on branch circuits in harmony with other types of instruments or may be used independently, and to provide a device which will not require specially trained operators.

A still further object is to ensure accuracy of transmission and to enable the instantaneous translation of messages wherever a machine may be installed.

The principal features of the invention consist in the novel construction of a mechanism, whereby electric impulses transmitted through the line wire are received by a magnet which first operates the starting of the receiving mechanism in step with the sending mechanism and then actuates a series of selector devices which operate to select the character to be printed, both operations being effected by current of equal strength.

A further feature consists in the novel construction and arrangement of the impulse receiving mechanism and the means for translating from the receiving mechanism to the printing mechanism, whereby the impulse receiving structure becomes operative to receive during the progression of the printing functions.

A still further and very important feature consists in the novel manner of operating the rotating head carrying the selector members at a uniform rate of speed through the intermittent application of power to a flexible medium operatively connected with the head and in operating the various controlling devices from the shaft of the selector head, thereby ensuring the synchronous operation of all parts of the mechanism.

In the art of automatic telegraphing it is well known to transmit electric pulses to the line wire by various means. It is not important to this invention just what means are utilized to transmit these pulses, but it is important to note that the pulses transmitted are all conveyed from an ordinary strength of electric current supply.

The important feature lies in the reception of the pulses by a single operating magnet thus overcoming the difficulties of synchronism between the sending and receiving mechanisms, for the pulses sent by the sending mechanism are received and translated instantaneously and it is only necessary to provide a means within the sending and receiving devices which will operate at a substantially similar speed for a comparatively very short period, as according to this invention each character is chosen by a very limited number of pulses, preferably five, and a starting or synchronizing pulse operates at the beginning of each series of pulses.

In the drawings Figure 1 is a plan view of the receiving and selector mechanism.

Figure 7 is a skeleton plan view of the mechanism for operating the printing mechanism.

Figure 8 is a side elevational view of the mechanism illustrated in Figure 7.

In illustrating the present invention it is not necessary to illustrate the complete machine as many of the parts with which the invention is associated are capable of considerable variation according to the type of typewriting machine or printing mechanism which may be adopted. The whole mechanism is assembled in a suitable frame which has no particular significance in relation to the present invention.

Figure 1:
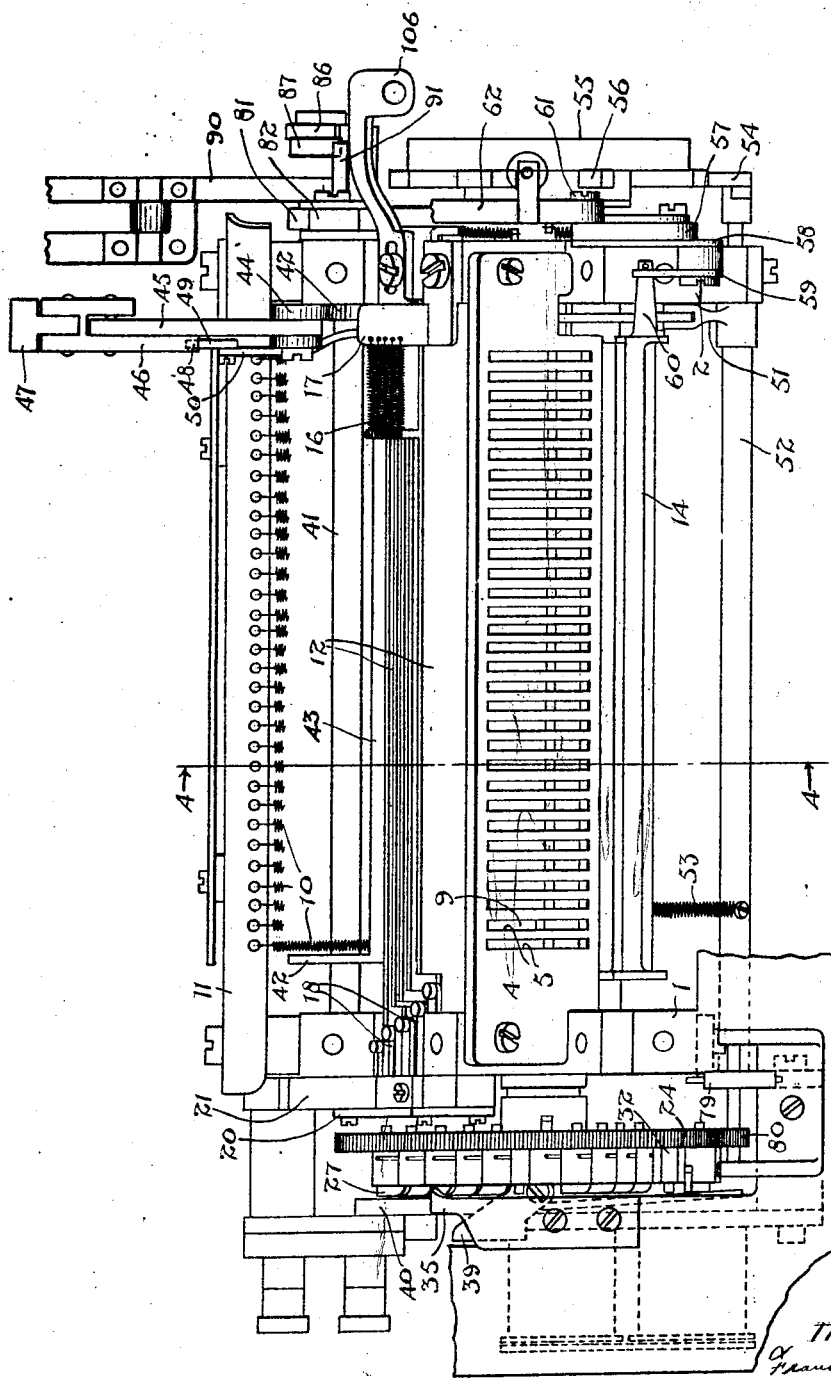
Figure 2:
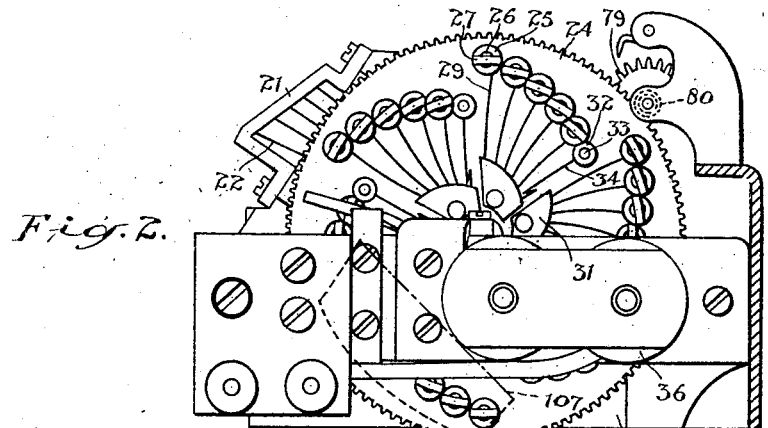
Figure 2 is an end elevational view of the selector head and operating magnet.
Figure 3:
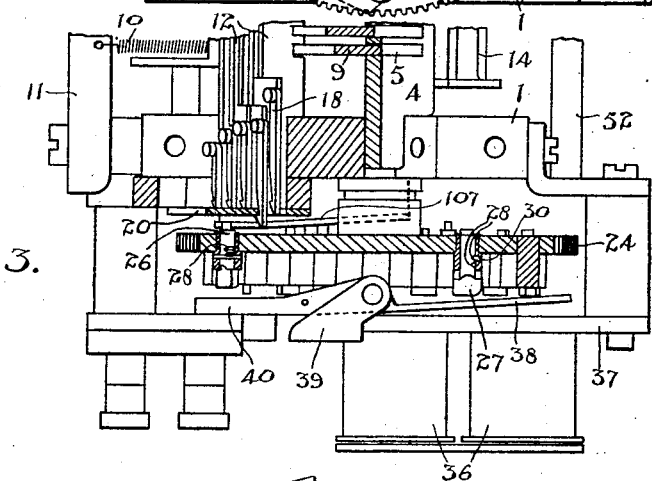
Figure 3 is a plan sectional detail showing the latches of the selector bars and the synchronizing and selector pins and the means for returning the selector pins.
Figure 4:
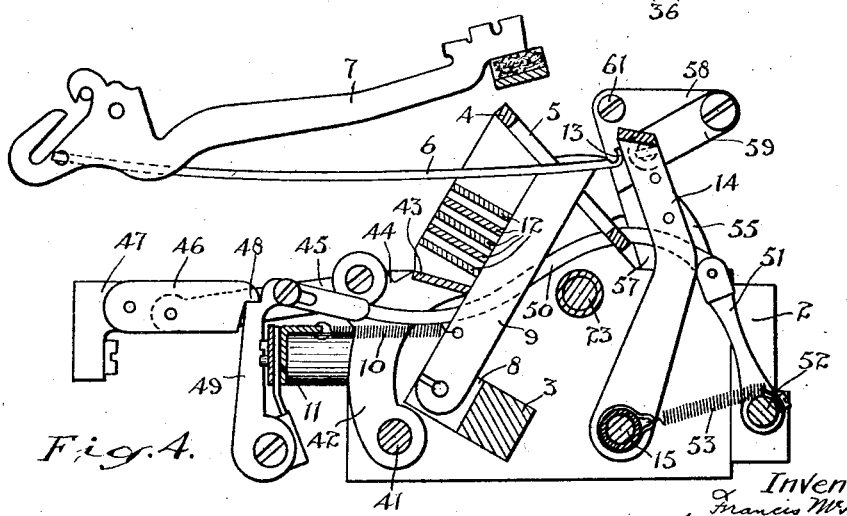
Figure 4 is a cross section through Figure 1 on the line 4—4 showing the type operating members and latch lock.
Figure 5:
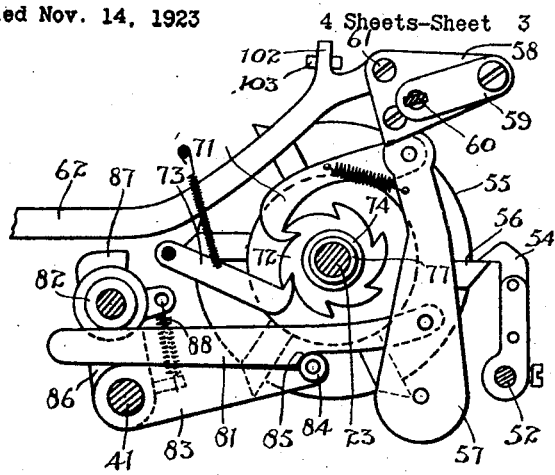
Figure 5 is an elevational detail of the latch control and the members for winding the spring for operating the selector head.
Figure 6:
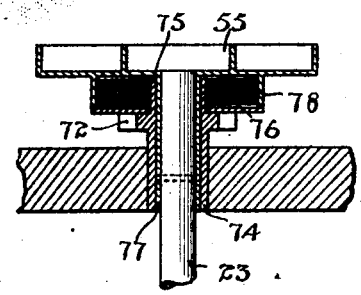
Figure 6 is a sectional detail of the spring mechanism for operating the selector head.
Figure 10:
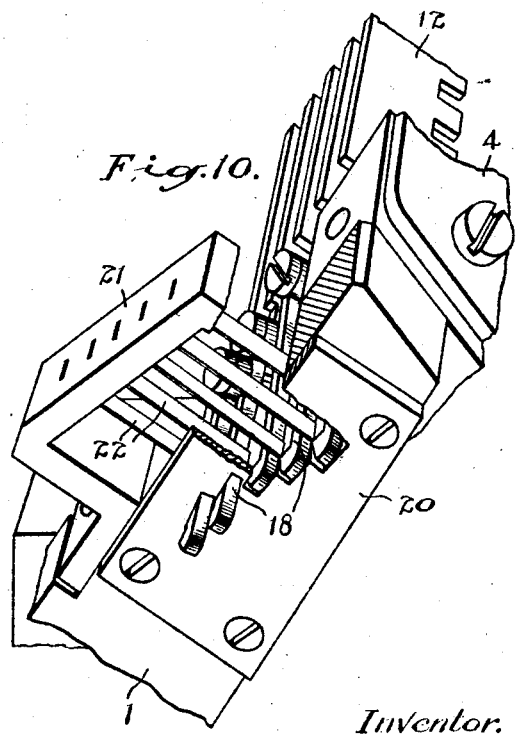
Figure 10 is an enlarged perspective view of the selector bar latch mechanism shown partly in section.
Figure 9:
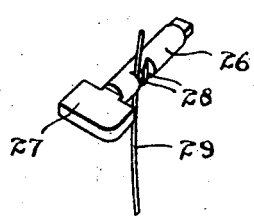
Figure 9 is an enlarged perspective view of one of the selector pins.

At the forward end of the frame, in front of the typewriter carriage and type mechanism is placed the mechanism illustrated in plan in Figure 1.

This mechanism comprises a pair of metal blocks 1 and 2 which are rigidly connected by the cross bar 3 and the comb bar 4, the latter having a plurality of parallel cross slots 5 therethrough through which the rods 6 of the type bars 7 extend. The cross bar 3 is formed with a plurality of slots 8 which are in alignment with the slots 5 of the comb 4 and in the slots 8 are pivotally supported a plurality of flat fingers 9 which project through the comb slots and engage the underside of the type bar rods 6. The fingers 9 are spring held upward by individual coil springs 10 connected to a cross bar 11 extending between the blocks 1 and 2.

The selector bars 12 are slidably supported at each end in the blocks 1 and 2 and are parallelly arranged in substantially right angular relation to the fingers 9 and are engaged thereby. The edges of the selector bars engaging the fingers 9 are notched in a suitable manner to form certain combinations which will allow the fingers 9 to move past their normal position so that their upper ends will lift the type rods and said type rods are formed with hooked ends 13 which engage the bail 14 which extends across the machine at the forward side of the comb, it being pivotally supported on the cross rod 15.

The selector bars 12 are moved transversely by individual coil springs 16 secured to a bracket 17 on the block 2 and connected to said bars adjacent to one end. At the other end the bars 12 are provided with pivotal latches 18 formed with hooked ends which extend through a perforated plate 20.

A bridge piece 21 is secured to the block 1 above the latches and carries the springs 22 so that the hooked latch ends extending through the plate 20 are spring held in locking contact therewith with the bevelled hooked ends projecting therethrough.

A shaft 23 is rotatably mounted in the blocks 1 and 2 and on one end thereof is secured the selector head 24 which is in the form of a flat disc having a spur gear periphery.

Upon the head 24 are mounted a plurality of bushings 25 arranged in a plurality of series, each of said series forming substantially an involute.

Within the bushings 25 are slidably arranged the pins 26 which project through to the inward side of the selector head and are formed with flattened ends. The outer ends of the pins are here shown formed with T-shaped heads 27 which rest in transverse slots in the outer ends of the bushings. Each pin is formed intermediate of its length with a double detent 28 which is engaged by a spring 29 entering a slot 30 cut in the side of the bushing.

The springs 29 are secured in groups on blocks 31 secured to the outer face of the selector head.

At the innermost end of each involute series of bushings is a plain cylindrical bushing 32 in which is arranged a pin 33 which projects outwardly beyond the ends of the T-shaped heads of the pins 26 being held out by a spring 34.

A stop member 35 is arranged in a rigid position on the frame in the path of the stop pins 33 (Fig. 1) so that said pins engage the stop and arrest the movement of the selector head.

An electro magnet 36 is supported on a subframe 37 carried by the block 1 and an armature 38 pivotally supported on a bracket 39 is provided with an extension arm 40 which when the magnet is energized is adapted to engage the end of the stop pin holding the head from rotation and push said pin inwardly to release the head.

The speed of rotation of the head is regulated in a manner hereinafter described to a definite speed and the electrical pulses sent to the magnet are regulated by the sending apparatus so that as the head rotates each pulse received will operate the arm 40 to engage the head of the pin 26 of the series which is then opposite to the arm.

The pins 26 are held in their outward position by the spring members 29 engaging the detents therein but upon pressure being applied to the head of the pin by the magnet arm 40 the pin moves inwardly and the spring engages the other portion of the detent to hold the pin in the inward position. The inner ends of the pins selected project inwardly from the inside of the head and as the head carries these pins past the latches 18 the pins engage the latches successively accordingly as the pins are arranged. The angular set of the latches corresponds with the involute setting of the pins so that the pins engage the latches successively as each pin travels in its circular path, thus the selection of the selector bars is effected to choose the desired type bar.

In the operation of the selector bars it is of course necessary that the fingers 9 be held from contact with the bars 12 which must move with perfect freedom and the actuating springs are of necessity light in order that the latches 18 may release freely.

On the completion of the setting of each series of pins the next succeeding stop pin 33 will engage the stop 35 and arrest the movement of the head.

A shaft 41 journalled in the blocks 1 and 2 back of the cross bar 3 has rigidly secured thereto a pair of curved arms 42 connected by a cross bar 43 which engages the fingers 9 to press them forwardly clear of the selector bars.

One of the arms 42 is provided with a lug 44 to which is connected a link 45. This link is pivotally connected at its other end to a short link member 46 supported on a bracket 47 rigid with the frame of the machine. The pivot point of connection between the links 45 and 46 is below a line drawn between the fixed pivot of the short link 46 and the pivotal connection of the link 45 with the lug 44.

The link 46 is formed with a finger projection 48 which engages a latch arm 49 mounted on a fixed pivot carried by the cross bar 11. This latch is adapted to be moved forwardly a sufficient distance to allow the finger projection to drop clear, thus allowing the toggle formed by the two links 46 to break downwardly, the action of the springs 10 against the fingers 9 actuating said toggle.

Connected to the latch arm 49 is a bent bar 50 which extends forwardly beneath the cross bar 43 and over the shaft 23 and is connected to an arm 51 rigidly mounted upon a shaft 52 journalled in the main supporting blocks 1 and 2.

A spring 53 is connected to a short arm on the shaft 52 to hold the arm 51, bar 50 and latch arm 49 to the rearward position in engagement with the finger projection of the link 48.

Upon the end of the shaft 52 projecting beyond the block 2 is secured a latch arm 54 and upon the shaft 23 is mounted a wheel 55 carrying a plurality of bevelled fingers 56 adapted to engage the bevelled end of the latch arm 54 so that as the wheel rotates the latch arm will be periodically operated to pull upon the latch arm 49 through the bar 50.

An arm 57 pivotally mounted on the outer side of the block 2 close to its base has connected to its upper end an offset 58, to the outer end of which is secured a link 59 which is connected to a projection 60 from one of the supporting arms of the bail 14.

At the top end of the arm 57 is secured a pin 61 to which is pivotally connected the operating bar 62 which bar extends rearwardly and is operated by the cam 63 mounted on a shaft 64 which is actuated in a forward direction by a spring 65 encircling the same.

The bar 62 is provided with an extension arm 66 at its rear end projecting upwardly and having a roller 67 thereon engaging a cam 68 arranged upon a shaft 69 which is driven through the clutch 70 by a suitable train of gearing.

The forward operation of the main operating bar 62 swings the arm 57 in a forward direction. Pivotally attached to the arm 57 is a ratchet pawl 71 which engages a ratchet wheel 72 loosely mounted upon the shaft 23.

A holding pawl 73 is mounted on the block 2 to engage the ratchet wheel 72 and hold said wheel as it is advanced. The wheel 72 forms part of the sleeve 74 which is journalled in the block 2 and has an outwardly projecting sleeve end 75 to which is secured one end of a helical spring 76.

A sleeve 77 rotatably mounted in the sleeve 74 of the ratchet wheel is rigidly secured to the shaft 23 and carries on its outer end the wheel 55. This wheel is provided with an annular flange 78 which houses the spring 76 and to which the outer end of the spring is secured.

It will thus be seen that by the rotation of the ratchet wheel the spring will be wound up and the torsion of the spring will be applied to the shaft. The shaft is held from rotation by the stop pins 33 in the selector head engaging the stop 35 and when the stop pins are withdrawn the movement of the shaft is regulated by a suitable regulating device, here shown in the form of an escapement 79 having a pinion 80 engaging the spur geared perimeter of the selector head 24.

A mechanical escapement is here shown but it may be preferable to use a form of magnetic brake to regulate the speed of movement of the selector head so that the pins 26 in the bushings 25 will move past the end 40 of the electro-magnet armature at a uniform rate of speed and in synchronism with the head of the sending machine.

It will be understood that as the torsion is applied to the spring 76 by means of the bail operating mechanism a definite amount of movement is applied at each operation of the bail and as the selector head moves a definite distance each time, the torsion on the shaft 24 will be practically constant and the regulating device will have no difficulty in maintaining speed of movement of the head on both the sending and receiving machines at practically the same speed, consequently the sending device will synchronize with the receiving device with great accuracy between the stops. As the distance of travel of the selector head between the pulses is considerable there is ample latitude for variation between the speed of movement of the sending and receiving heads without error.

A cam bar 81 is connected to the arm 57 at a point adjacent to its pivot and is guided at its rear end by a grooved roller 82 and the boss of a lever 83, which lever is provided with a forked end carrying a roller 84. This roller is engaged by a cam surface 85 on the bar 81 on each forward movement of the bail.

The lever 83 is rigidly secured to the shaft 41 so that upon the forward movement of the bail, the lever is depressed to swing the arms 42 forwardly and bring the cross bar 43 into engagement with the fingers 9 to depress them against the pressure of their springs 10 and to clear them from contact with the selector bars 12.

As the links 45 and 46 are connected to one of the arms 42 the forward movement of the cross bar 43 straightens the links so that the latch arm 49 is engaged by the finger projection 48 of the link 46. This ensures the holding of the cross bar 43 in the forward position until such time as a further selection has been made.

An arm 86 is rigidly secured to the outer end of the shaft 41 beyond the lever 83 and upon the inner side of this arm is pivotally mounted a latch member 87 which is held in a forward position by a spring 88.

The bail operating bar 62 has a cam 89 arranged on its underside and engaging this cam is a pivotal arm 90 which rests substantially in a horizontal position and has a roller contact engaging said cam.

The forward end of the pivotal arm 90 is turned upwardly and provided with a lateral extension 91 which normally rests upon the top of the latch 87.

The arm 90 is held in its upper position by the lug 91 resting upon the top of the latch 87 so that the cam 89 of the bail operating arm 62 engages the roller on the arm 90 and it cannot move forward until the latch arm 49 operates to release the locking toggle formed by the links 45 and 46 allowing the pressure of the springs pulling upon the fingers 9 to press upwardly against the cross bar 43 which swings the arms 42 rearwardly, thus turning the shaft 41 and as the shaft 41 carries the arm 86 the backward movement moves the latch 87 clear of the lug 91 allowing it to drop. The forward pressure of the bail operating bar 62 actuated by the spring 65 then depresses the pivotal arm 90 and the arm 62 moves forward in the operation of the bail.

The extension arm 66 of the bail operating bar is provided with a slotted link 93 which engages a crank rod 94 connected to a cross shaft 95 which carries the clutch operating arm 96. The clutch consists of a latch bolt 97 sliding radially in a slot in the disc 98 secured to the cam shaft 69 and projects outwardly from the periphery to engage the slotted rim of the wheel 99 in the train of gears. The arm 96 is formed with a bevelled surface which engages the projecting pin 100 of the latch bolt and as the disc is rotated the arm 96 forces the pin inwardly withdrawing the latch bolt from engagement with the wheel 99, thus allowing the wheel to continue to rotate without rotating the cam. The cam 68 is formed with a spiral to move the arm 66 backwardly its maximum distance and it is then formed coaxially to free the arm and allow it to move forwardly under the impulse of the spring 65.

The forward movement of the bar 62 carries the arm 66 with it, also the slotted link 93 and the link engaging the crank 94 swings the cross shaft, withdrawing the clutch operating arm from engagement with the face of the disc 98 and therefore clear of the clutch pin 100 allowing the clutch bolt 97 to spring outwardly and again engage the driving wheel 99.

The clutch operating arm 96 is moved into contact with the disc 98 by a spring held arm 101.

The bail operating bar 62 is formed with a lug 102 adjacent to its connection to the lever 57, said lug carrying a roller 103 which engages an arm 104 pivotally mounted on the frame of the machine and swings said arm on its pivot. This swinging arm is provided with a lug extension 105 which is connected to a link 106 which presses against the ends of the selector bars to return them to their normal position after having effected the selection of one of the fingers 9.

It will be noted that this operation occurs simultaneously with the forward movement when the bail is moved outwardly and the cross bar 43 is holding the fingers 9 clear of the selector bars.

I have not attempted to describe the mechanism co-operating with the structure described for operating the carriage of the typewriter or ribbon mechanism, as such may be varied considerably without interfering with the operation of the message receiving apparatus.

In the operation of this machine the electrical pulses are sent over the line by a device which is timed and controlled to operate at a certain well defined speed.

Upon the starting of the sending mechanism a pulse is transmitted to the magnet which operates its armature to engage the pin 33 in engagement with the stop 35. The tension of the spring 76 is set at a predetermined pressure to rotate the shaft 23 and because this tension is of a very definite quality, the speed controller (which has been described and is here shown as a simple escapement but may be a magnetic brake), regulates the speed of rotation of the selector head very accurately. As the head rotates the pins 26 move into alignment with the armature extension 40 and as the pulse is transmitted to the magnet the armature operates and pushes on the pin in alignment therewith.

It will be seen that the latitude against error is exceptionally large because of the arrangement of the T-shaped heads on the pins. The selector head may move a considerable distance out of tune with the head of the sending device but the pins will still receive the action of the pulse.

As the pins are selected through the operation of the armature they are held in their selected position either pushed in or left out, by the springs 29 engaging the double detent of the pins.

The involute arrangement of the pins in the selector head is very important as each pin in the series travels in its own circular path and it will engage only the latch of the selector bar arranged in that same path, consequently if the pin is pushed in its corresponding selector bar will be released by the engagement of the pin with the selector bar latch swinging the latch on its pivot to let it slip through the hole in the plate 20. It will also be noted that the selection is extremely sensitive. The magnet has no actual work to accomplish in the selection, that is, it has no load. It merely pushes the little pins in and the pins in turn, on the rotation of the selector head, merely release the small latches holding the selector bars. These then operate under the action of their own individual springs and according to the combination set up they present an opening for one of the fingers 9 but the fingers 9 are, during the selection, held clear from the selector bars by the cross bar 43 which is locked by the latch arm 49 and links 45 and 46.

The wheel 55 is, as described, secured to the shaft of the selector head and carries the radial fingers 56 which correspond in number with the number of the series of selector pins on the head and are arranged to operate the latch arm 49 through the connections described. When the arm 49 is moved forward the finger projection 48 of the link 46 is relased and the pressure of the springs 10 through the fingers 9 upon the cross bar 43 breaks the toggle of the links 45 and 46 downwardly, thus allowing the selection to be made.

The secondary lock in the form of the latch 87 holds the arm 90 in locking engagement with the bail operating bar 62 until the latch arm 49 is released which causes the arm 86 carrying the latch to be swung rearwardly allowing the lug 91 on the arm 90 to drop, thus freeing the cam 89 on the arm 62 and allowing it to move forward under the impulse of its actuating spring. The forward movement swings the arm 57 on its pivot carrying with it the bail 14 which engages the type bar rod and operates the type bar and as the pawl 71 is carried upon the arm 57 the ratchet wheel is turned the distance of one tooth, thus pulling upon the inner end of the spring. This occurs each time the bail is operated and as the selector head moves a corresponding distance at the selection and operation of each type bar to the distance of movement of the pawl, the spring is maintained in a state of uniform and constant tension.

The forward movement of the arm 57 also operates the cam bar 81 to operate the lever 83 which is secured to the shaft 41, thus moving the cross bar 43 into contact with the fingers 9 and withdrawing them from engagement with the selector bars and instantaneously allowing said bars to be returned by the operation of the link 106 in the manner described as soon as the bail engages the type bar rod.

It will be readily understood from this description that the selector head may immediately proceed with the selection of a new series of pins and the operation of the selector bars while the printing mechanism is in operation. This overlap is extremely important because it enables the machine to operate with practically double the speed it would have if the selection were required to await the completion of each cycle of the printing operation.

A fixed cam plate 107 is arranged on the side of the block 1 to engage the inner ends of the selector pins as the head rotates pushing them outwardly in position to be again operated upon by the magnet.

I have not shown or described any particular means for operating the driving mechanism nor any means for controlling same as a suitable motor controlled by a time switch actuated by suitable signals may be used. It will be particularly noted that the operation of the selector head is not dependent upon the accurate timing of the operating motor but said head is driven for very short periods by a spring held under uniform pressure and these periods are definitely controlled and the driving element responds instantaneously to the releasing pulse.

The machine here shown is adapted for receiving a five unit code, that is, there are five selective pins for each letter or character to be printed but it will be readily understood that this number may be altered to suit any requirement and is practically universal. A very important element of advantage in the present device is that it operates equally well on pulses that are of variable or uniform intensity and is therefore capable of being operated in conjunction with sending devices of various forms, that is, it may be operated with any start and stop class of sending or continuous synchronous systems.

A receiving machine such as described may be used in private offices at a comparatively small cost and requires no expert manipulation and will remain in constant service and synchronism and is therefore particularly adaptable for extending branch services from multiplex machines.

The preferred construction is herein shown and described but it must be understood that considerable variation in design may be effected without departing from the principal features set forth.

What I claim as my invention is:—

1. A telegraph receiver, comprising, an electromagnet adapted to receive electric pulses, a rotatable selector head, means for periodically arresting said head adapted to be released by said electro-magnet, selector devices carried by said head and moved to their functioning position by engaging the armature of said magnet, and printing means controlled by said selector devices.

2. A telegraph receiver, comprising a rotatable selector head maintained under constant and uniform torque and governed to rotate at a uniform speed, an electro-magnet, means for periodically arresting said head adapted to be released by said electro-magnet, selector devices arranged on said head and operated when moving by the armature of said magnet, and printing means controlled by said selector devices.

3. A telegraph receiver, comprising, an electro-magnet adapted to receive electric pulses, a rotatable selector head adapted to rotate at a uniform speed, means for periodically arresting said head adapted to be released by said electro-magnet, selector devices arranged on said selector head and adapted to be operated by engagement with the armature of said electro-magnet during the rotation of said head, printing devices, and means extending into the paths of movement of said selector devices on said head for selecting the printing devices.

4. A telegraph receiver, comprising, an electro-magnet adapted to receive electric pulses, a rotatable selector head adapted to rotate at a uniform speed and torque, means for periodically arresting said head adapted to be released by said electro-magnet, selector devices arranged on said selector head and adapted to be moved to their functioning position by engagement with the armature of said electro-magnet during the rotation of said head, printing devices, and means extending into the paths of movement of the selector devices on said head during the rotation of said head and adapted to be engaged thereby to effect the selection of the printing devices.

5. A telegraph receiver, comprising, an electro-magnet adapted to receive electric pulses, a rotatable selector head adapted to rotate at a uniform speed, means for periodically arresting said head adapted to be released by said electro-magnet, a plurality of movable members arranged on said head in a substantially involute arrangement and adapted to pass successively across the armature of said magnet to be operated thereby when pulses are received by said magnet, printing devices, and means extending into the path of movement of said movable members to be operated thereby and to operate said printing devices.

6. A telegraph receiver, comprising, an electro-magnet adapted to receive electric pulses, a rotatable selector head adapted to rotate at a uniform speed, means for periodically arresting said head adapted to be released by said electro-magnet, a plurality of transversely slidable members arranged in an involute series in said head, an armature for said magnet adapted to be moved by the energizing of the magnet into the path of said slidable members and to engage and slide said members to project from the head, latch members arranged in an involute series to be engaged and released by the projected slidable members on the head, selector members controlled by said latches, and printing means controlled by said selector members.

7. A telegraph receiver, comprising, an electro-magnet adapted to receive electric pulses, a rotatable selector head adapted to rotate at a uniform speed, means for periodically arresting said head controlled by said electro-magnet, a plurality of transversely slidable members arranged in an involute series in said head, an armature adapted to be moved by the energizing of the magnet into the path of said slidable members and to engage and slide said members to project from the head, slidable selector bars arranged in substantially perpendicular arrangement with said selector head, a plate having a hole therethrough opposite each of said bars, a spring latch pivotally secured to each selector bar and extending through said plate and adapted to be released by the members projected from the head, and printing means controlled by said selector bars.

8. A telegraph receiver, comprising, an electro-magnet adapted to receive electric pulses, a rotatable selector head adapted to rotate at a uniform speed, means for periodically arresting said head controlled by said electro-magnet, a plurality of transversely slidable members arranged in an involute series in said head, an armature adapted to be moved by the energizing of the magnet into the path of movement of said slidable members and to engage and slide said members to project from the head, slidable selector bars arranged in substantially perpendicular arrangement with said selector head, a plate having a hole therethrough opposite each of said bars, said holes being placed in an involute arrangement, a spring latch pivotally secured to each selector bar and extending through said plate to be engaged and released from the plate by the projected slidable members in the selector head in succession, and printing means controlled by said selector bars.

9. A telegraph receiver, comprising, an electro-magnet adapted to receive electric pulses, a rotatable selector head adapted to rotate at a uniform speed, means for periodically arresting said head adapted to be released by said electro-magnet, pins arranged in an involute series and slidable transversely in said head and adapted to be projected therethrough, said pins each having a double detent therein, a spring for each pin engaging said detents to hold the pins in either of two positions, an armature for said magnet adapted when energized to engage the head ends of said pins, selector bars actuated by said pins, and printing means controlled by said selector bars.

10. A telegraph receiver, comprising, an electro-magnet adapted to receive electric pulses, a rotatable selector head adapted to rotate at a uniform speed, a plurality of selector pins arranged in said head, a stop pin slidably arranged in said selector head, a fixed stop to engage said stop pin, an armature for said magnet adapted to release said stop pin from engagement with said fixed stop and to actuate said selector pins during the movement of the head, and printing devices controlled by said selector pins.

11. A telegraph receiving device, comprising, a rotatable selector head adapted to rotate at a uniform speed, means for periodically arresting said selector head, an electro-magnet adapted to release said arresting means, selector members on said head operable by said electro-magnet, selector bars controlled by the rotatable selector members, type bars, means for operating said type bars, means controlling the operation of said type bars adapted to co-operate with said selector bars, means for restraining the operation of said type bar controlling means during the operation of the selector bars, and means controlled by the movement of the selector head for releasing said restraining means.

12. A telegraph receiving device, comprising, a rotatable selector head adapted to rotate at a uniform speed, means for periodically arresting said selector head, an electro-magnet adapted to release said arresting means, selector members on said head operable by said electro-magnet, selector bars controlled by the rotatable selector members, type bars, operating rods connected to said type bars, a swinging bail adapted to operate said rods, bars individually engaging said operating rods to move them into operating engagement with said bail and controlled by said selector bars, means for withholding said bars controlled by the selector bars from engagement therewith, and means controlled by the movement of the selector head for releasing said withholding means.

13. A telegraph receiving device, comprising, a rotatable selector head adapted to rotate at a uniform speed, means for periodically arresting said selector head, an electro-magnet adapted to release said arresting means, selector members on said head operable by said electro-magnet, selector bars controlled by the rotatable selector members, type bars, operating rods connected to said type bars, a swinging bail adapted to operate said rods, bars individually engaging said operating rods to move them into operating engagement with said bail and controlled by said selector bars, a cross bar engaging said bars controlled by the selector bars, a latch holding said cross bar in engagement with the aforesaid bars to hold them clear of the selector bars, a wheel rotatable with the selector head having projections uniformly spaced thereon, and means co-operating with said projections adapted to release said latch.

14. A telegraph receiving device, comprising, a rotatable selector head adapted to rotate at uniform speed, means for periodically arresting said selector head, an electro-magnet adapted to release said arresting means, selector members on said head operable by said electro-magnet, selector bars controlled by the rotatable selector members, type bars, means for operating said type bars, means controlling the operation of said type bars adapted to co-operate with said selector bars, means for restraining the operation of said type bar controlling means, a toggle link connected with said restraining means, a latch holding said toggle extended, and means connected with the selector head for releasing said latch.

15. A telegraph receiving device, comprising, a rotatable selector head adapted to rotate at uniform speed, means for periodically arresting said selector head, an electro-magnet adapted to release said arresting means, selector members on said head operable by said electro-magnet, selector bars controlled by the rotatable selector members, printing mechanism controlled by said selector bars, and means connected with the printing mechanism for returning the selector bars to their receiving position immediately following the commencement of the operation of the printing mechanism enabling the operation of the selector head to proceed while the printing mechanism is operating.

16. A telegraph receiving device, comprising, a rotatable selector head adapted to rotate at uniform speed, means for periodically arresting said selector head, an electro-magnet adapted to release said arresting means, selector members on said head operable by said electro-magnet, selector bars controlled by the rotatable selector members, printing mechanism controlled by said selector bars, spring actuated means for actuating the printing mechanism, and means operated by the printing mechanism actuating means for returning the selector bars to their receiving position.

17. A telegraph receiving device, comprising, a rotatable selector head, means for periodically arresting said selector head, an electro-magnet adapted to release said arresting means, selector devices carried by said head and operable by said electro-magnet, type bars controlled by said selector members, spring actuated means for operating said type bars, and means for operating said selector head adapted to operate during the operation of the type bars.

18. A telegraph receiving device, comprising, a rotatable selector head, means for periodically arresting said selector head, an electro-magnet adapted to release said arresting means, selector devices carried by said head and operable by said electro-magnet, type bars controlled by said selector members, means for operating said type bars, a spring having one end connected with said selector head, a rotatable member connected with the other end of said spring, and means actuated by the type bar operating means for operating the rotatable member connected with said spring to apply tension to said spring at regular intervals.

19. A telegraph receiving device, comprising, a rotatable selector head, means for periodically arresting said selector head, an electro-magnet adapted to release said arresting means, selector devices carried by said head and operable by said electro-magnet, type bars controlled by said selector members, means for operating said type bars, a spring having one end connected with said selector head, a rotatable member connected with the other end of said spring, and means actuated by the type bar operating means for operating the rotatable member connected with said spring to apply tension to said spring while the selector head is at rest equivalent to the tension released by the operation of the selector head in its periods of movement.

20. A telegraph receiving device, comprising, a rotatable selector head, means for periodically arresting said selector head, an electro-magnet adapted to release said arresting means, selector devices carried by said head and operable by said electro-magnet, type bars controlled by said selector members, means for operating said type bars, a spring having one end connected with said selector head, a rotatable member connected with the other end of said spring, a ratchet wheel carried by said rotatable member, a pawl carried by said type bar operating means and adapted to rotate said ratchet, and means for holding said ratchet wheel from return movement.

21. A telegraph receiving device, comprising, a rotatable selector head, means for periodically arresting said selector head, an electro-magnet adapted to release said arresting means, selector devices carried by said head and operable by said electro-magnet, type bars controlled by said selector members, a pivotal bail for operating said type bars, means for swinging said bail, a pivotal arm connected with said bail, a pawl carried by said arm, a ratchet wheel co-operating with said pawl, a drum secured to said ratchet wheel, a helical spring secured in said drum, and a shaft secured to said helical spring and connected to said selector head.

22. A telegraph receiving device, comprising, type bars, electrically controlled means for selecting the type bar to be operated, a reciprocating member adapted to effect the operation of the type bars, means controlled by the selecting means for controlling the operation of the reciprocating member, and spring means for actuating the reciprocating member.

23. A telegraph receiving device, comprising, type bars, electrically controlled means for selecting the type bar to be operated, a reciprocating member adapted to effect the operation of the type bars, a spring adapted to operate said reciprocating member in one direction to cause the type bars to print, a power driven cam adapted to return said reciprocating member and reset said spring, and means controlled by the selecting mechanism for controlling the return of said reciprocating member.

24. A telegraph receiving device, comprising, type bars, electrically controlled means for selecting the type bar to be operated a reciprocating member adapted to effect the operation of the type bars, a spring adapted to operate said reciprocating member in one direction to cause the type bars to print, a power driven cam adapted to return said reciprocating member and reset said spring, a clutch controlling the operation of said cam, means actuated by the forward movement of the reciprocating member adapted to throw the clutch into engagement to operate the cam, and means controlled by the selecting mechanism for controlling the return of the reciprocating member.

25. A telegraph receiving device, comprising, type bars, electrically controlled means for selecting the type bar to be operated, a reciprocating member adapted by its movement in one direction to effect the operation of the type bars in the printing movement, a bail for operating the type bars connected to said reciprocating member, spring means for moving said reciprocating member forward, means for obstructing the forward movement of said reciprocating member, means controlled by the selecting means for controlling said obstructing member and power means for returning said reciprocating member and resetting said spring.

26. A telegraph receiving device, comprising, type bars, electrically controlled means for selecting the type bar to be operated, a spring actuated reciprocating member adapted to effect the operation of the type bars and having an obstruction surface, a member adapted to engage the obstruction surface of said reciprocating member, a latch member supporting the latter member in an obstructing position, means controlled by the selector head for releasing the type bar control mechanism, and means co-operating with the latter means adapted to release said holding latch.

27. A telegraph receiving device, comprising, type bars, electrically controlled means for selecting the type bar to be operated, a swinging bail for operating the type bars, a spring actuated reciprocating member connected with said bail, a cam bar operated by said swinging bail, a lever operated by said cam bar, a latch member, a bar resting on said latch member and forming an obstruction to the forward movement of said reciprocating member, means operated by said lever for withholding the operation of the type bars, and means connecting said latch with the latter means and adapted to release the obstruction to the forward movement of the bail operating member.

FRANCIS McKAY.